(12) United States Patent
Huang et al.

(10) Patent No.: US 8,528,007 B1
(45) Date of Patent: Sep. 3, 2013

(54) FIRMWARE DOWNLOADING THROUGH PROCESS FILE SYSTEM

(75) Inventors: Frank Huang, Pleasanton, CA (US); Xiaohua Luo, San Jose, CA (US); Robert Lee, Fremont, CA (US); James Jan, San Jose, CA (US); Zheng Cao, Union City, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 13/601,368

(22) Filed: Aug. 31, 2012

Related U.S. Application Data

(63) Continuation of application No. 13/280,017, filed on Oct. 24, 2011, now Pat. No. 8,261,257, which is a continuation of application No. 11/939,891, filed on Nov. 14, 2007, now Pat. No. 8,046,776.

(60) Provisional application No. 60/867,944, filed on Nov. 30, 2006.

(51) Int. Cl.
*G06F 3/00* (2006.01)
*G06F 9/44* (2006.01)
*G06F 9/46* (2006.01)
*G06F 13/00* (2006.01)
*G06F 9/445* (2006.01)

(52) U.S. Cl.
USPC ............ 719/327; 719/312; 717/168; 717/174

(58) Field of Classification Search
None
See application file for complete search history.

(56) References Cited

U.S. PATENT DOCUMENTS

2003/0217358 A1  11/2003  Thurston et al.
2004/0194081 A1*  9/2004  Qumei et al. ................. 717/173

OTHER PUBLICATIONS

Richard Sharpe, Linux Tips IO Redirection, Jan. 28, 2000.
UNIX Tutorial Three, Oct. 9, 2000.
Kermit File Transfer and Management as an SSH Subsystem Kermit as an SFTP Replacement, Apr. 16, 2002.

* cited by examiner

*Primary Examiner* — H S Sough
*Assistant Examiner* — Craig Dorais

(57) ABSTRACT

A host includes an operating system segmented into a user space and a kernel space with a driver. The user space stores a firmware file and the kernel space includes memory. The driver is stored in the kernel space and performs download cycles to download the firmware file to the memory. The device driver, during a first download cycle, transfers a first block of data to the memory. During each download cycle performed subsequent to the first download cycle, the driver is configured to: identify first and second segments of the memory, where data including the first block of data was stored in the first segment during a previous download cycle; copy the data including the first block of data from the first segment to the second segment; and transfer a block of data of the firmware file, not previously stored in the memory, to the second segment.

20 Claims, 4 Drawing Sheets

FIRMWARE DOWNLOADING THROUGH PROCESS FILE SYSTEM

CROSS-REFERENCE TO RELATED APPLICATIONS

This application is a Continuation Application of U.S. patent application Ser. No. 13/280,017 filed on Oct. 24, 2011 now U.S. Pat. No. 8,261,257, which is a Continuation Application of U.S. patent application Ser. No. 11/939,891, filed on Nov. 14, 2007 now U.S. Pat. No. 8,046,776, which claims the benefit of U.S. Provisional Application No. 60/867,944 filed on Nov. 30, 2006. The entire disclosures of the above applications are incorporated herein by reference.

BACKGROUND

In computing, firmware is software that is embedded in a hardware device. It is often provided on flash ROMs or as a binary image file that can be downloaded into existing hardware. In some systems, a host computer transfers the firmware to the hardware device. This transfer of the firmware is handled by a device driver.

For example, firmware downloading from a host system to a device driver in a wireless area local network (WLAN) card is required in some systems. Downloading the firmware file to the card typically requires the driver to access the firmware file. Due to a license or other restriction typically associated with the firmware, however, the firmware file either cannot be installed in the driver, or cannot be accessed by the driver directly from kernel space. For example, the file has to be released under a GPL (General Public License), which is undesirable. In this case, a special application or other method is needed to download the firmware file from user space (file system) of the host system to the device driver in kernel space if the kernel does not support firmware downloading. However, it is typically not desirable to provide a WLAN card with an application that is capable of accessing files from kernel space. Accordingly, it would be desirable to provide an improved method and system for downloading firmware from a host system to a hardware device.

SUMMARY

A host system is provided and includes an operating system and a device driver of a hardware device. The operating system is segmented into (i) a user space, and (ii) a kernel space. The user space stores a firmware file. The kernel space includes memory. The device driver is stored in the kernel space and is configured to perform multiple download cycles to download the firmware file from the user space to the memory of the kernel space. The hardware device is separate from the operating system. In performing the download cycles, the device driver is configured to, during a first download cycle of the download cycles, transfer a first block of data of the firmware file to the memory of the kernel space.

During each current download cycle of the download cycles performed subsequent to the first download cycle, the device driver is configured to: identify a first segment of the memory of the kernel space and a second segment of the memory of the kernel space, where data including the first block of data of the firmware file was stored in the first segment of the memory of the kernel space during a previous download cycle; copy the data including the first block of data of the firmware file from the first segment of the memory of the kernel space to the second segment of the memory of the kernel space; and transfer a block of data of the firmware file, not previously stored in the memory of the kernel space, to the second segment of the memory of the kernel space. The block of data, not previously stored in the memory of the kernel space, prior to the transfer to the second segment of the memory of the kernel space, is appended to the data stored in the second segment of the memory of the kernel space.

In other features, a host system is provided and includes an operating system and a device driver of a hardware device. The operating system includes a user space, a kernel space, and a process file system. The user space is configured to store a firmware file. Access to the firmware file stored in the user space is restricted. The kernel space includes memory and is configured to (i) receive the firmware file from the user space, and (ii) store the firmware file in the memory. The process file system is configured to process the firmware file stored in the kernel space. The device driver is stored in the kernel space and is unable to directly download the firmware file from the user space to the memory due to the restricted access to the firmware file in the user space. The hardware device is separate from the operating system. The device driver is configured to: communicate with the process file system to download the firmware file from the user space to the memory; and use (i) a first command and a second command to download the firmware file from the user space to the memory, and (ii) the second command and not the first command to download the firmware file from the memory to the hardware device.

The present disclosure provides a method and system for transferring a firmware file between a host system and a device driver. The host system includes an operating system segmented into a user space and a kernel space. Aspects of the exemplary implementation include using a first type of process file system command in the user space to initiate a transfer of the firmware file between the host system and the device driver. The firmware file exists in the user space and the device driver exists in the kernel space. A second type of process file system command is used in the user space to transfer the firmware file between the user space and the device driver in kernel space.

According to the method and system disclosed herein, pre-existing file system commands are used to access the firmware file and to download the firmware file to the device driver. Because the device driver does not access the firmware file directly, the firmware file may have different license restrictions than the device driver is allowed access to.

DESCRIPTION

The present disclosure relates to an improved method and system for downloading firmware from a host system to a device driver. The following description is presented to enable one of ordinary skill in the art to make and use implementations disclosed herein. Various modifications to the implementations and the generic principles and features described herein will be readily apparent to those skilled in the art. Thus, the present disclosure is not intended to be limited to the implementations shown, but is to be accorded the widest scope consistent with the principles and features described herein.

Figure 1:
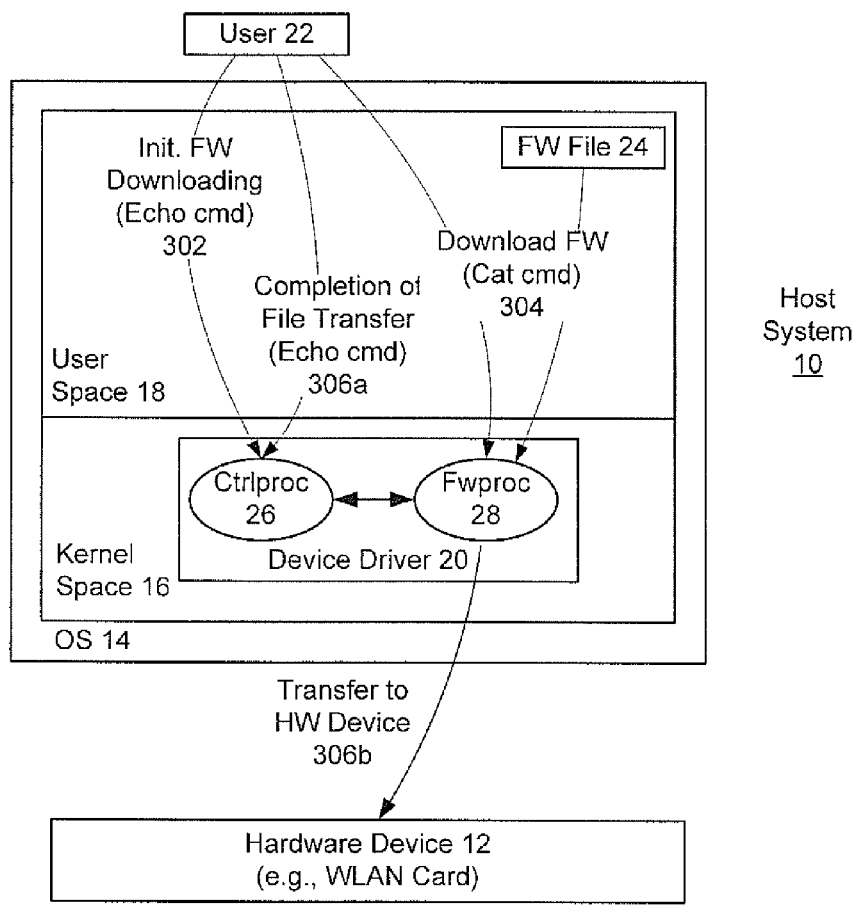
FIG. 1 is a block diagram illustrating an exemplary system for downloading firmware from a host system to a device driver.

FIG. 1 is a block diagram illustrating an exemplary system B for downloading firmware from a host system 10 to a device driver 20. The host system 10 is may be a computing system having standard hardware components, such as memory and a processor (not shown), and at least one hardware device 12 that is run or controlled, at least, in part by firmware. An example of such a hardware device 12 includes, but is not limited to, a wireless local area network (WLAN) card, for instance.

In the exemplary implementation, the host system 10 includes a protected mode operating system 14 that is segregated into a kernel space 16 and a user space 18. Kernel space 16 is a memory area reserved for executing kernel-level components and device drivers. User space 18 is a memory area where user-mode application programs execute. A user 22 interacts with the host computer 10 through programs running in user space 18. The device driver 20 for the hardware device 12 exists in the kernel space 16 in the OS 14 of the host system 10. As is well known in the art, device drivers are computer programs that allow other programs to interact with hardware devices, or to work as if the programs are interacting with a particular hardware device.

Occasionally, a firmware image file 24 may be required to be downloaded from the host system 10 to the hardware device 12. A potential problem exists, however, if the device driver 20 in kernel space 16 is unable to access and download the firmware image file 24 from user space 18 for the corresponding hardware device 12 due to a license or other restriction associated with the firmware image file 24.

The exemplary implementation provides a method and system for downloading the firmware image file (hereinafter, firmware file) 24 from user space 18 of the host system 10 to the device driver 20. According to the exemplary implementation, commands of a process file system in the OS 14 are used to enable the device driver 20 to transfer the firmware file 24 from the user space 18 to the kernel space 16. The process file system (procfs) is an existing pseudo-file system provided by UNIX/LINUX-like operating systems to access process information in the kernel. Process file systems typically include several commands, such as a command for initiating a file download from user space 18, and a command for performing a file download. In the LINUX operating system, for example, these commands are referred to as "echo", and "cat", respectively.

According to the exemplary implementation, process file system commands are used to access the firmware file 24 and to download the firmware file 24 to the device driver 20. By modifying the device driver 20 to interact with the process file system and its existing commands, the device driver 20 can access and download the firmware file 24 in user space 18 without the need of a special application. Because the device driver 20 does not access the firmware file 24 directly, the firmware file 24 may have different license restrictions than the device driver 20 is allowed access to.

Figure 2:
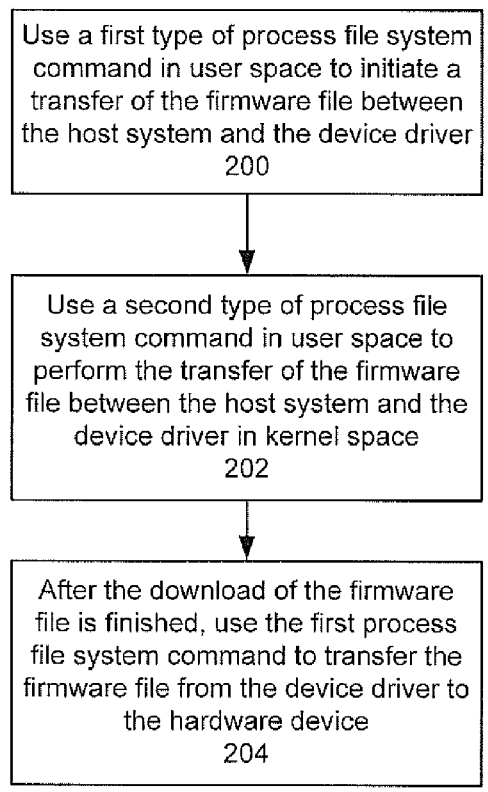
FIG. 2 is a flow diagram illustrating a process for transferring the firmware file between a host system and a device driver in accordance with the present disclosure.

FIG. 2 is a flow diagram illustrating a process for transferring the firmware file 24 between a host system 10 and a device driver 20 in accordance with the exemplary implementation. The process begins by using a first type of process file system command in user space 18 to initiate a transfer of the firmware file 24 between the host system 10 and the device driver 20 (step 200). A second type of process file system command in user space 18 is then used to perform the transfer the of the firmware file 24 between the host system 10 and the device driver 20 in the kernel space 16 (step 202). According to the exemplary implementation, the existing process file system commands can be used for both reading and writing files from the user space 18. However, in an alternative implementation, the process file system commands are used to download the firmware file 24 from the host user space 18 to the device driver 20. After the transfer/download of the firmware file 24 is finished, the type of first process file system command is used again to transfer the firmware file 24 from the device driver 20 to the hardware device 12 (step 204).

In the implementation where the LINUX/UNIX OS or its equivalent is used, the first type of process file system command used to both initiate the transfer of the firmware file 24 from the host system 10 to the device driver 20 and to transfer the firmware file 24 from the device driver 20 to the hardware device 12 after downloading is an "echo" type command, while the second type of process file system command used to perform the download of the firmware file 24 is a "cat" type command.

Figure 3:
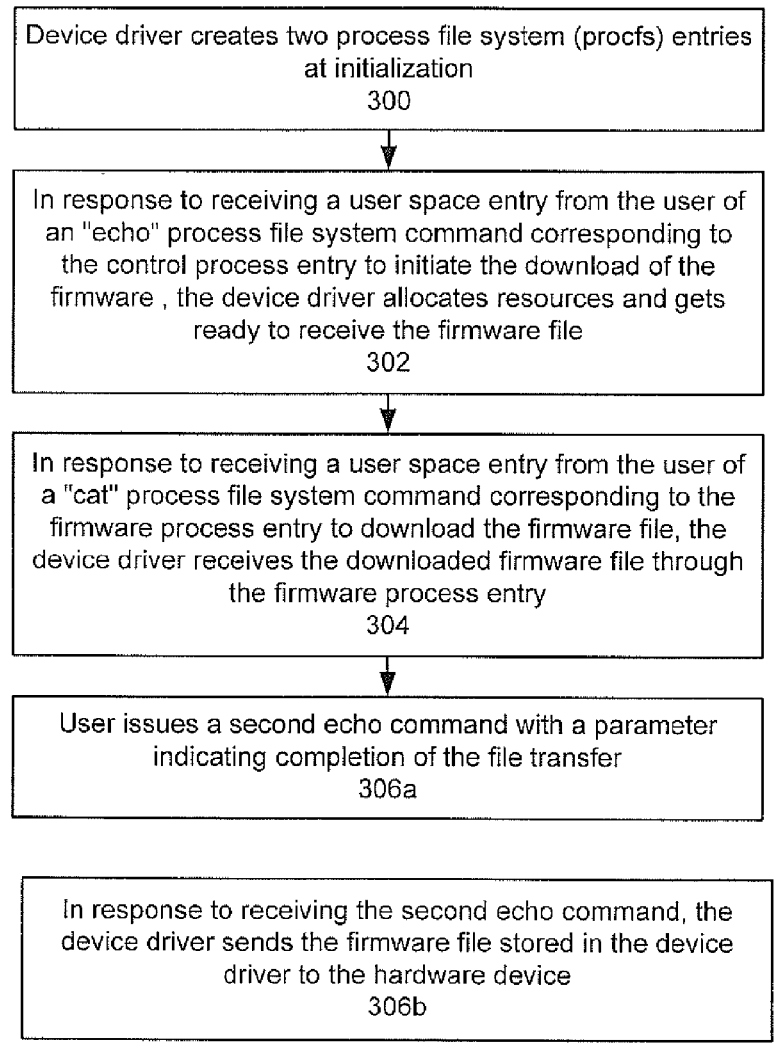
FIG. 3 is flow chart illustrating the process performed by the device driver for downloading the firmware file from the host system using the process file system in accordance with the present disclosure.

FIG. 3 is flow chart illustrating the process performed by the device driver 20 for downloading the firmware file 24 from the host system 10 using the process file system in accordance with the exemplary implementation. The process begins with the device driver 20 creating two process file system (procfs) entries at initialization (step 300), where one procfs entry is used to control firmware downloading, and the other is used to receive the firmware file 24 from user space 18 during the actual download.

Referring to FIG. 1, in one implementation, the device driver 20 creates a control process entry (ctrlproc) 26, and a firmware process entry (fwproc) 28 that are responsive to the "echo" and "cat" commands, respectively. The control process entry 26 is used to initiate the download of the firmware file 24 from the user space 18 to device driver 20 and to communicate to the device driver 20 that a download of the firmware file 24 is ready. The firmware process entry 28 receives the firmware file block-by-block during the download. Once the download is complete, the control process entry 26 is used a second time to trigger the transfer of the firmware file 24 to the hardware device 12 from the device driver 20.

Referring to both FIGS. 1 and 3, in response to receiving a user space entry from the user 22 of the "echo" process file system command corresponding to the control process entry 26 to initiate the download of the firmware 24, the device driver 20 allocates memory resources and waits to receive the firmware file 24 (step 302). For example, the command may be entered with the format "echo 0>/proc/ctrlproc" at a command line prompt, where "0" is a parameter of the command indicating the initiation of the download. The echo command communicates to the control process entry 26 that a download of the firmware file 24 is ready. In response, the device driver 20 allocates necessary resources and waits to receive the firmware file 24 after this command is received.

In response to receiving a user space entry from the user 22 of the "cat" process file system command corresponding to the firmware process entry 28 to download the firmware file 24, the device driver 20 receives the downloaded firmware file 24 through the firmware process entry 28 (step 304). For example, the user may enter the command "cat firmware.txt>/proc/firmwareproc", where "firmware.txt" is an example file name for the downloaded firmware file 24.

According to one implementation, the firmware file 24 may be downloaded from user space 18 to the device driver 20 through the firmware process entry 28 block-by-block. According to this implementation, the device driver 20 allocates memory dynamically to receive each block, and the previous memory block is freed before a new one is allocated for next block, as described below in conjunction with FIG. 4. After the downloading of the firmware file 24 is finished, the firmware file 24 is saved in the device driver 20.

To trigger the downloaded firmware file 24 being sent to a hardware device 12, the user 22 issues a second echo command from user space 18 with a parameter indicating completion of the file transfer. For example, the user 22 may enter the command "echo 1>/proc/ctrlproc", where "1" is the parameter indicating completion of the transfer/download (step 306a). In response, to receiving the second echo command, the device driver 20 sends the firmware file 24 stored in the device driver 20 to the hardware device 12 (step 306b).

Figure 4:
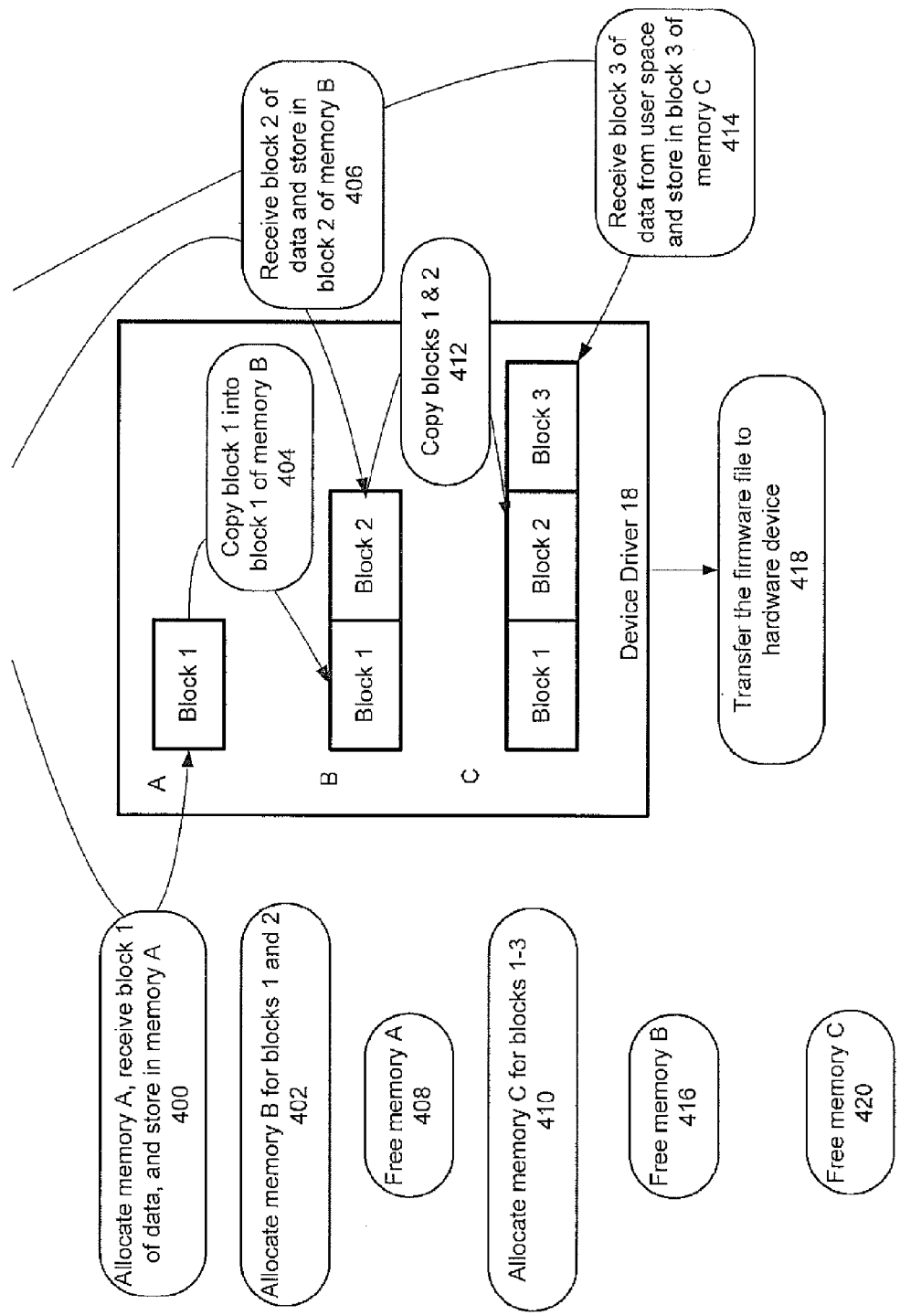
FIG. 4 is a diagram illustrating a memory allocation process performed by the device driver during firmware file downloading in order to receive the firmware file one block at a time.

FIG. 4 is a diagram illustrating a memory allocation process performed by the device driver 20 during firmware file downloading in order to receive the firmware file 24 one block at a time. Because the device driver 20 does not know the total size of the firmware file 24 being downloaded and receives the firmware file 24 block-by-block, the device driver 20 allocates a memory having a size of a currently received data block and the previously received data block to save memory.

Once the device driver 20 receives the command to initiate firmware download, e.g., the "cat" command, the device driver 20 allocates memory A having a size of block 1, receives block 1 of data from user space 18 and stores the data in memory A (step 400).

The device driver 20 allocates a new memory B having a size of two blocks, blocks 1 and 2, or the sum of memories A and B (step 402). The device driver 20 copies block 1 of data stored in memory A into block 1 of memory B (step 404). The device driver 20 receives block 2 of data from user space 18 and stores the data in block 2 of memory B (step 406). The device driver 20 frees memory A, which was allocated for block 1 of the data (step 408).

The device driver 20 allocates a memory C having the size of the three blocks, blocks 1, 2 and 3, or the sum of memories A, B, and C (step 410). The device driver 20 copies the data stored in blocks 1 and 2 of memory B into blocks 1 and 2 of memory C (step 412). The device driver 20 receives block 3 of data from user space 18 and stores the data of block 3 of memory C (step 414). The device driver 20 frees memory B, which was allocated for blocks 1 and 2 of the data (step 416).

If all of the data blocks of the firmware file 24 have been received, then the firmware file 24 stored in memory C will be transferred to hardware device 12 when the command signaling completion of the file transfer is received (step 418). The device driver 20 frees memory C after firmware file 24 is sent to the hardware device 12 (step 420). Otherwise, steps 410 through 416 are repeated until all data blocks of the firmware file 24 are received.

A method and system for implementing an improved method and system for downloading firmware from a host to a device driver has been disclosed. Exemplary implementation utilizes existing capability provided by the OS 14 to minimize the work necessary to download and firmware file 24 from user space 18 to kernel space 16th, but without allowing the device driver 20 to access the file at all. In one implementation, before the firmware file 24 is distributed for downloading, the format of the firmware image, which is a binary file, is changed to match the format of the particular hardware device 12. In another implementation, the firmware file 24 can be encrypted prior to downloading, and then decrypted within the hardware device 12, but the firmware file data need not be processed by the device driver 20.

The present disclosure has been described in accordance with the implementations shown, and one of ordinary skill in the art will readily recognize that there could be variations to the implementations, and any variations would be within the spirit and scope of the present invention. For example, techniques disclosed herein can be implemented using hardware, software, a computer readable medium containing program instructions, or a combination thereof. Software written according to the present disclosure is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

What is claimed is:

1. A host system comprising:
an operating system segmented into (i) a user space, and (ii) a kernel space, wherein the user space stores a firmware file, and wherein the kernel space comprises memory; and
a device driver of a hardware device, wherein the device driver is stored in the kernel space and is configured to perform a plurality of download cycles to download the firmware file from the user space to the memory of the kernel space, wherein the hardware device is separate from the operating system, and wherein, in performing the plurality of download cycles, the device driver is configured to
during a first download cycle of the plurality of download cycles, transfer a first block of data of the firmware file to the memory of the kernel space, and
during each current download cycle of the plurality of download cycles performed subsequent to the first download cycle,
identify a first segment of the memory of the kernel space and a second segment of the memory of the kernel space, wherein data including the first block of data of the firmware file was stored in the first segment of the memory of the kernel space during a previous download cycle,
copy the data including the first block of data of the firmware file from the first segment of the memory of the kernel space to the second segment of the memory of the kernel space, and
transfer a block of data of the firmware file, not previously stored in the memory of the kernel space, to the second segment of the memory of the kernel space,
wherein the block of data, not previously stored in the memory of the kernel space, prior to the transfer to the second segment of the memory of the kernel space, is appended to the data stored in the second segment of the memory of the kernel space.

2. The host system of claim 1, wherein a number of the plurality of download cycles to be performed by the device driver is based on a number of blocks of data remaining in the user space and not already downloaded from the user space to the memory.

3. The host system of claim 1, wherein the block of data, not previously stored in the memory, is stored in the second segment of the memory sequentially following the data copied from the first segment of the memory.

4. The host system of claim 1, wherein:
the operating system comprises a process file system; and
the process file system is configured to process the firmware file stored in the kernel space based on a plurality of commands of the process file system.

5. The host system of claim 4, wherein:
the device driver has restricted access to the firmware file and is unable to directly download the firmware file from the user space to the memory due to the restricted access to the firmware file; and
the device driver is configured to communicate with the process file system to download the firmware file.

6. The host system of claim 4, wherein:
the plurality of commands include a first command and a second command; and
the device driver is configured to use
the first command and the second command to download the firmware file from the user space to the memory, and
the second command and not the first command to download the firmware file from the memory to the hardware device.

7. The host system of claim 1, wherein the device driver is configured to:
use a first command in the user space to initiate the download of the firmware file from the user space to the memory; and
use a second command in the user space to perform the download of the firmware file from the user space to the memory.

8. The host system of claim 7, wherein the device driver is configured to:
create a control process entry in the memory (i) at initialization of the download of the firmware file from the user space to the memory, and (ii) in response to the first command;
control the download of the firmware file from the user space to the memory based on the control process entry;
create a firmware process entry in the memory (i) at initialization of the download of the firmware file from the user space to the memory, and (ii) in response to the second command; and
the firmware process entry includes the firmware file subsequent to the download of the firmware file from the user space to the memory.

9. The host system of claim 8, wherein the device driver is configured to, subsequent to completing the download of the firmware file from the user space to the memory, trigger the download of the firmware file from the memory to the hardware device based on the control process entry.

10. The host system of claim 8, wherein the device driver is configured to:
download the firmware file block-by-block from the user space to the memory based on the firmware process entry;
allocate memory blocks in the kernel space to receive each block of the firmware file including the first block of data and a second block of data; and
free a first memory block in the kernel space of the first block of data prior to allocating a second memory block in the kernel space for the second block of data.

11. The host system of claim 8, wherein the device driver is configured to:
receive the first command from the user space and at the control process entry; and
allocate resources in the kernel space to receive the firmware file in response to receiving the first command.

12. The host system of claim 1, wherein:
access to the firmware file stored in the user space is restricted;
the kernel space is configured to (i) receive the firmware file from the user space, and (ii) store the firmware file in the memory;
the operating system comprises a process file system;
the processing file system is configured to process the firmware file stored in the kernel space; and
the device driver is unable to directly download the firmware file from the user space to the memory due to the restricted access to the firmware file in the user space, wherein the device driver is configured to
communicate with the process file system to download the firmware file from the user space to the memory, and
use (i) a first command and a second command to download the firmware file from the user space to the memory, and (ii) the second command and not the first command to download the firmware file from the memory to the hardware device.

13. The host system of claim 12, wherein the device driver is configured to:
use the first command in the user space to initiate the download of the firmware file from the user space to the memory; and
use the second command in the user space to perform the download of the firmware file from the user space to the memory.

14. The host system of claim 12, wherein the device driver is configured to:
create a control process entry in the memory (i) at initialization of the download of the firmware file from the user space to the memory, and (ii) in response to the first command;
control the download of the firmware file from the user space to the memory based on the control process entry;
create a firmware process entry in the memory (i) at initialization of the download of the firmware file from the user space to the memory, and (ii) in response to the second command; and
the firmware process entry includes the firmware file subsequent to the download of the firmware file from the user space to the memory.

15. The host system of claim 14, wherein the device driver is configured to, subsequent to completing the download of the firmware file from the user space to the memory, trigger the download of the firmware file from the memory to the hardware device based on the control process entry.

16. The host system of claim 14, wherein the device driver is configured to:
download the firmware file block-by-block from the user space to the memory based on the firmware process entry;
allocate memory blocks in the kernel space to receive each block of the firmware file including the first block of data and a second block of data; and
free a first memory block in the kernel space of the first block of data prior to allocating a second memory block in the kernel space for the second block of data.

17. The host system of claim 16, wherein, when performing the download of the firmware file block-by-block, the device driver is configured to:
determine whether a complete version of the firmware file is stored in the memory; and perform the download of the firmware file from the memory to the hardware device when the complete version of the firmware file is stored in the memory.

18. The host system of claim 17, wherein:

the device driver is configured to perform the download of the firmware file from the user space to the memory block-by-block independent of a size of the firmware file; and the device driver is configured to perform the download of the firmware file from the user space to the memory block-by-block based on (i) a first size of the first block of data received from the user space, and (ii) a second size of the second block of data received from the user space subsequent to receiving the first block of data.

19. The host system of claim 14, wherein the device driver is configured to:

receive the first command from the user space and at the control process entry; and allocate resources in the kernel space to receive the firmware file in response to receiving the first command.

20. The host system of claim 19, wherein the device driver is configured to:

receive a third command from the user space, wherein the third command indicates completion of the download of the firmware file from the user space to the memory, wherein the third command is of a same type as the first command; and perform the download of the firmware file from the memory to the hardware device in response to receiving the third command.

\* \* \* \* \*